(12) United States Patent
Sugitani

(10) Patent No.: US 9,775,030 B2
(45) Date of Patent: Sep. 26, 2017

(54) WIRELESS COMMUNICATION DEVICE

(71) Applicant: PANASONIC INTELLECTUAL PROPERTY MANAGEMENT CO., LTD., Osaka (JP)

(72) Inventor: Toshiyuki Sugitani, Saga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/930,817

(22) Filed: Nov. 3, 2015

(65) Prior Publication Data
US 2016/0150404 A1 May 26, 2016

(30) Foreign Application Priority Data
Nov. 21, 2014 (JP) .................. 2014-236602

(51) Int. Cl.
*H04L 29/06* (2006.01)
*H04W 12/04* (2009.01)
(Continued)

(52) U.S. Cl.
CPC ........ *H04W 12/04* (2013.01); *G06F 12/1408* (2013.01); *H04L 1/08* (2013.01); *H04L 12/2803* (2013.01); *H04L 63/0492* (2013.01); *H04L 63/061* (2013.01); *H04W 52/0216* (2013.01); *H04L 9/0891* (2013.01); *H04W 12/02* (2013.01); *H04W 12/06* (2013.01); *Y02B 60/50* (2013.01)

(58) Field of Classification Search
CPC . H04W 12/04; H04W 52/0216; H04W 12/06; H04W 12/02; G06F 12/1408; H04L 1/08; H04L 12/2803; H04L 63/0492; H04L 63/061; H04L 9/0891; Y02B 60/50
See application file for complete search history.

(56) References Cited

U.S. PATENT DOCUMENTS

| 2004/0107344 A1 | 6/2004 | Minemura et al. |
| 2009/0088924 A1 | 4/2009 | Coffee et al. |

(Continued)

FOREIGN PATENT DOCUMENTS

| JP | 2004-194196 | 7/2004 |
| JP | 2008-199421 | 8/2008 |

(Continued)

OTHER PUBLICATIONS

"Digital Enhanced Cordless Telecommunications (DECT); Ultra Low Energy (ULE); Machine to Machine Communications; Home Automation Network (phase 1)", ETSI TS 102 939-1, V1.1.1, Apr. 2013, pp. 1-169.

(Continued)

*Primary Examiner* — Carl Colin
*Assistant Examiner* — Ghodrat Jamshidi
(74) *Attorney, Agent, or Firm* — Greenblum & Bernstein, P.L.C.

(57) ABSTRACT

Provided is a wireless communication device for packet communication. In a case where a communication failure occurs, authentication of the other communication party is performed. In a case where the other communication party is a legitimate party, an encryption key for packet communication is updated, a packet number is returned to an initial value, and the packet communication is resumed.

9 Claims, 6 Drawing Sheets

(51) Int. Cl.
- H04L 1/08 (2006.01)
- H04W 52/02 (2009.01)
- G06F 12/14 (2006.01)
- H04L 12/28 (2006.01)
- H04W 12/06 (2009.01)
- H04L 9/08 (2006.01)
- H04W 12/02 (2009.01)

(56) References Cited

U.S. PATENT DOCUMENTS

| | | | |
|---|---|---|---|
| 2010/0306538 A1* | 12/2010 | Thomas | H04L 9/0844 713/168 |
| 2011/0119487 A1* | 5/2011 | Alexander | H04L 9/0891 713/160 |
| 2011/0274277 A1 | 11/2011 | Hennebert | |
| 2015/0033014 A1* | 1/2015 | McGrew | H04L 9/30 713/168 |

FOREIGN PATENT DOCUMENTS

| | | |
|---|---|---|
| JP | 2011-254459 | 12/2011 |
| WO | 02/093826 | 11/2002 |
| WO | 2006/116620 | 11/2006 |

OTHER PUBLICATIONS

"Digital Enhanced Cordless Telecommunications (DECT); Common Interface (CI); Part 2: Physical Layer (PHL)", ETSI EN 300 175-2, V1.9.1, Sep. 2005, pp. 1-64.

"Digital Enhanced Cordless Telecommunications (DECT); Common Interface (CI); Part 5: Network (NWK) layer", ETSI EN 300 175-5, V1.9.1, Sep. 2005, pp. 1-309.

"Digital Enhanced Cordless Telecommunications (DECT); Common Interface (CI); Part 3: Medium Access Control (MAC) layer", ETSI EN 300 175-3, V1.9.1, Sep. 2005, pp. 1-235.

The Extended European Search Report from the European Patent Office, dated Apr. 21, 2016, for the related European Patent Application No. 15192875.1.

* cited by examiner

WIRELESS COMMUNICATION DEVICE

BACKGROUND OF THE INVENTION

1. Field of the Invention

The present relates to a wireless communication device.

2. Description of the Related Art

In recent years, with the remarkable spread of data communication that is performed in a wireless manner, there have been advances in high communication speed, miniaturization of a wireless communication device, and low power consumption. For example, wireless communication in compliance with a Digital Enhanced Cordless Telecommunications (DECT) scheme that has been spread worldwide as a communication scheme for digital cordless telephone is stipulated in ETSI EN 300 175-2: "Digital Enhanced Cordless Telecommunications (DECT); Common Interface (CI); Part 2: Physical Layer (PHL)," ETSI EN 300 175-3: "Digital Enhanced Cordless Telecommunications (DECT); Common Interface (CI); Part 3: Medium Access Control (MAC) layer," and ETSI EN 300 175-5: "Digital Enhanced Cordless Telecommunications (DECT); Common Interface (CI); Part 5: Network (NWK) layer." Also in Japan, the use of wireless devices in compliance with the DECT scheme was approved, and wireless communication devices, such as a cordless telephone and an intercommunication system, have been of practical use. In recent years, a system in which household electrical appliances within a house are controlled from outside of the house, a household crime prevention system, or the like has gained popularity. Developments in wireless communication for communication between apparatuses on such a home automation network have been made. A method for packet communication for suitable for communication between apparatuses on the home automation network, which is based on the wireless communication in compliance with the DECT scheme, is stipulated in "ETSI TS 102 939-1: "Digital Enhanced Cordless Telecommunications (DECT); Ultra Low Energy (ULE); Machine-to-Machine Communications; Part 1; Home Automation Network (Phase 1)" (communication stipulated in ETSI TS 102 939-1: "Digital Enhanced Cordless Telecommunications (DECT); Ultra Low Energy (ULE); Machine-to-Machine Communications; Part 1; Home Automation Network (Phase 1)" is hereinafter referred to as DECT ULE communication).

In such packet communication, data is stored in a packet to which a number is added, transmission of and reception of data are performed on a packet-by-packet basis, re-transmission control is performed using the number that is added to the packet, and the transmission of and the reception of data are performed. In a case of the DECT ULE communication, when the data to be transmitted or received is not present, the wireless communication is interrupted, and when the transmission of the data starts, the packet communication is resumed with a simple sequence. Furthermore, regardless of the interruption of the wireless communication, the packet communication is performed using consecutive packet numbers. Thus, low power consumption and a reduction in data transmission delay are realized. In such packet communication, encryption or authentication of communication data for improving security is performed. In a case of the DECT ULE communication, with encryption communication that uses a counter with cipher block chaining message authentication code (CBC-MAC), security improvement in the packet communication is realized.

SUMMARY OF THE INVENTION

According to an aspect of the present invention, there is provided a wireless communication device that performs data communication using a packet to which a packet number is added from one wireless communication device to the other wireless communication device, the wireless communication device including: a wireless communication unit for transmitting and receiving packetized data; a packet number storage unit in which the packet number that is added to received packet is stored; an authentication key storage unit in which authentication key for performing authentication of the other communication party is stored; a packet encryption key storage unit in which a packet encryption key for encrypting a packet is stored; and a control unit that operates in such a manner that, in a case where the packet is encrypted using the packet number and the packet encryption key and transmission and reception for the packet communication are not correctly performed, the authentication is performed using the authentication key which is stored in the authentication key storage unit, and in such a manner that, in a case where the packet is encrypted using the packet number and the packet encryption key and the transmission and the reception for the packet communication are correctly performed, a new packet encryption key is generated, the generated packet encryption key is stored in the encryption key storage unit, writes a packet number that is determined in advance, to the packet number storage unit, and the packet communication is performed starting from a packet with the packet number that is determined in advance.

Accordingly, in a case where a reception error occurs while communication is in progress and a delivery acknowledgement is not correctly performed, only when the other communication party is a legitimate party, the packet encryption key is re-issued, the packet number is initialized, and thus the communication can be resumed.

According to another aspect of the present invention, there is provided a wireless communication device that performs communication in a time division communication scheme in which a frame that is partitioned for every predetermined time is divided into multiple slots and multiple communication is performed, the wireless communication device including: a message encryption key storage unit in which a message encryption key for encrypting a control message is stored; and a control unit that operates in such a manner that a packet number which is determined in advance is written to a packet number storage unit by exchanging a message that is determined in advance and that is encrypted using the message encryption key and a frame number which is updated from every frame and in such a manner that packet communication is performed starting from a packet with the packet number that is determined in advance.

Accordingly, the packet number can be initialized by exchanging the message that is encrypted using the frame number that changes with time.

DETAILED DESCRIPTION OF THE PREFERRED EMBODIMENT

Figure 1:
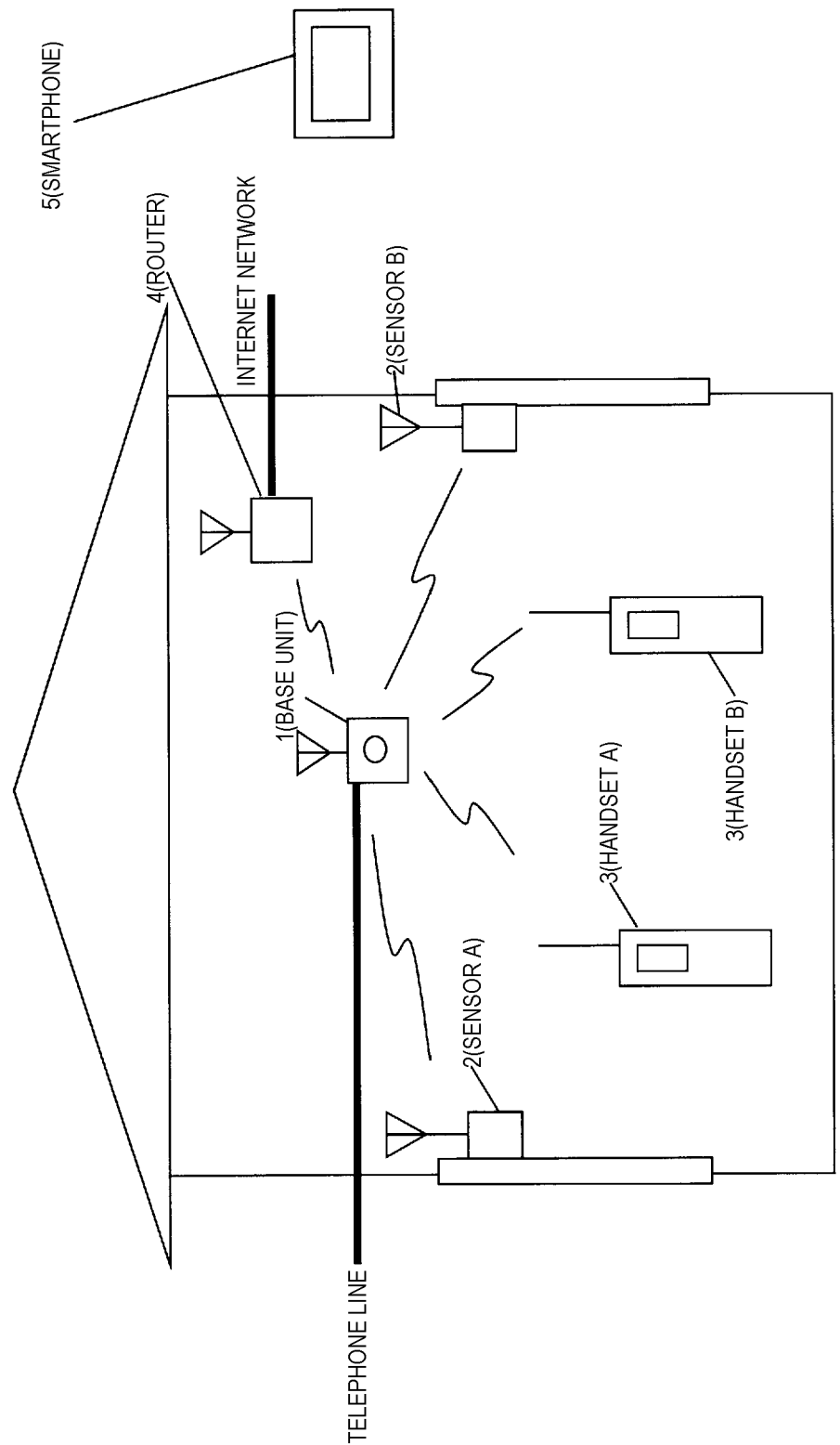
FIG. 1 is a diagram illustrating one example of a home automation network system that uses a wireless communication device according to a first exemplary embodiment.

In packet communication where packet communication is performed using consecutive packet numbers regardless of interruption of wireless communication, like in DECT ULE communication, the packet number is not initialized for every communication. For this reason, in a case where a reception error occurs while communication is currently in progress and a delivery acknowledgment is not correctly performed, a problem occurs that control becomes complicated. For example, in a home automation network that transmits information that is detected in a sensor from a battery-powered sensor that operates as a handset which uses the DECT ULE communication, to a base unit, in a case where while packet communication is currently in progress, a failure such as power outage occurs, and a message for the delivery acknowledgement cannot be transmitted from the base unit, because it cannot be acknowledged that transmitted data arrives at the base unit, a sensor makes an attempt at reconnection to the base unit, and performs a re-transmission operation such as repeating re-transmission. In a situation where such re-transmission control repeats until a battery is dead, because convenience is poor, normally, the re-transmission control is discontinued for a predetermined period of time. Thereafter, in a case where returning to a base-unit state takes place and a communication-available state is retained, a selection has to be made with respect to whether the packet communication is resumed using a number that is not taken by the last-time delivery acknowledgement, or the packet communication is resumed using the next number, and there is a need to perform recovery processing in which each usage case is considered. Thus, control is complicated.

A method of resuming the packet communication by returning the packet number to an initial value after a failure occurs is also considered. However, in a case where one full cycle of packet numbers is completed and a failure occurs at a timing when the packet number is exactly the same value as the initial value, because a packet that is sent before the failure occurs and a packet that is sent after the failure occurs cannot be distinguished from each other, in some cases, the receiving side cannot know that failure processing on the transmitting side is performed and failure removal processing is not correctly performed. Thus, there is a risk that the failure removal processing such as message omission recovery will not be correctly performed.

In a scheme in which the packet number is initialized when a failure occurs, in a case where, in the DECT ULE communication, the packet number is used for packet encryption and authentication, when the same packet number as that of the packet that contains the same data is sent, the encrypted packets are the same. Because of this, if communication failure is intentionally caused to occur, the packet number is initialized, and communication of an after-initialization encrypted message is intercepted, a relationship between an immediately-after-initialization encrypted message and a behavior of the wireless communication device can be investigated. If a falsification handset whose identification number is a copy of an identification number of a legitimate handset is prepared, communication with the base unit is activated, and the packet number is initialized, for example, by disconnecting the communication in a forced manner, when the after-initialization encrypted message and the behavior of the wireless communication device are known, this is to operate the wireless communication device in an illegal manner. That is, the scheme in which the packet number is initialized when the failure occurs has a problem of being vulnerable to a falsification attack. This causes a decrease in security performance.

An embodiment of the present invention will be described below.

First Exemplary Embodiment

Configuration of a Home Automation Network System

A configuration example of a wireless communication device according to a first exemplary embodiment is described. FIG. 1 is a diagram illustrating one example of a home automation network system that uses the wireless communication device according to the present embodiment.

The home automation network system that uses the wireless communication device according to the present invention, which is described in FIG. 1, is a system that realizes a telephone function for an outside-line call or for an inside-line call and a crime prevention function of notifying a user inside of or outside of a house that a window is opened or closed. FIG. 1 illustrates a case where the home automation network system is configured from base unit 1, sensor A2, sensor B2, handset A3, handset B3, router 4, and smartphone 5. Sensor A2 and sensor B2 that have the same function, and handset A3 and handset B3 that have the same function are described below as sensor 2 and handset 3, respectively.

In the home automation network system that uses the wireless communication device according to the present invention, which is described in FIG. 1, communication through wireless communication, for example, in compliance with a DECT scheme is possible between base unit 1 and sensor 2 and between base unit 1 and handset 3, and communication through wireless communication, for example, in compliance with a WiFi scheme is possible between base unit 1 and router 4. Base unit 1 is connected to smartphone 5 through router 4 over the Internet.

A user places an outside-line telephone call or an inside-line telephone call with handset 3, by using the home automation network system that uses the wireless communication device according to the present invention, which is illustrated in FIG. 1.

The home automation network system that uses the wireless communication device according to the present invention, which is illustrated in FIG. 1, operates in a normal mode or in a crime prevention mode. The crime prevention mode is a mode in which the user is notified through an alarm and the like that the window is opened, and the normal mode is a mode in which the user is not notified that the window is opened. The user activates the crime prevention mode when he/she leaves the house or goes to bed, and is protected against burglar's break-in.

In a case where the home automation network system operates in the crime prevention mode, when sensor 2 notifies base unit 1 that a window is opened, base unit 1 notifies handset 3 that the window is opened, base unit 1 and handset 3 raise the alarm, and thus a person in each room is notified that the window is opened. Base unit 1 makes a call to a designated telephone number through a telephone line, and, when the other party answers the call, transmits an audio message notifying that the window is opened. Base unit 1 transmits an electronic mail that notifies a registered address that the window is opened, through router 4 over the Internet, and notifies the user of smartphone 5 that the window is opened.

Configuration of Base Unit 1

Figure 2:
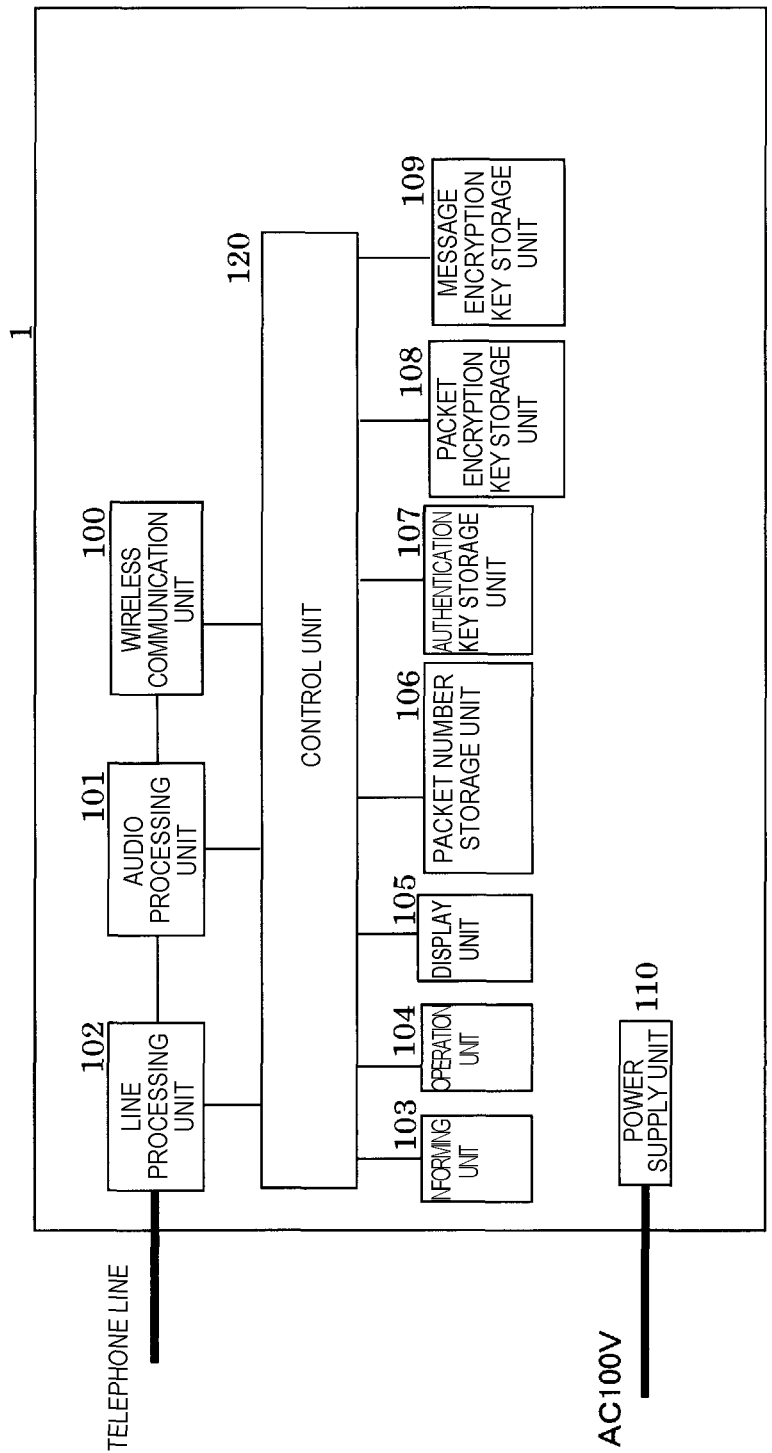
FIG. 2 is a block diagram illustrating one example of a configuration of a base unit according to the first exemplary embodiment.

A configuration example of base unit 1 is described. FIG. 2 is a block diagram illustrating a configuration example of base unit 1.

In FIG. 2, base unit 1 has wireless communication unit 100, audio processing unit 101, line processing unit 102, informing unit 103, operation unit 104, display unit 105, packet number storage unit 106, authentication key storage unit 107, packet encryption key storage unit 108, message encryption key storage unit 109, power supply unit 110, and control unit 120.

Wireless communication unit 100 transmits and receives control data or a packet for wireless link establishment or data telephone call to and from sensor 2, handset 3, and router 4 in a predetermined scheme that depends on a device of each of sensor 2, handset 3, and router 4. In the present specification, "wireless communication" is defined as including wireless transmission and wireless reception.

Audio processing unit 101 converts an audio signal that is input from the telephone line, into a digital signal, generates audio data for transmission to handset 3, converts audio data that is received from handset 3, or data for audio guidance that notifies that a window is opened, into an analog signal, and outputs the resulting analog signal to the telephone line.

Line processing unit 102 is an interface between the telephone line and base unit 1. Line processing unit 102 converts a signal at the line side and a signal at the base unit side into their respective suitable signal levels, and connects base unit 1 and the telephone line to each other.

In the case where the home automation network system operates in the crime prevention mode, when sensor 2 notifies base unit 1 that the window is opened, informing unit 103 outputs an informing sound.

Operation unit 104 is a button to which a user operation is applied. The user operations, for example, include an operation of stopping the informing sound, an operation of switching between the crime prevention mode and the normal mode, and the like.

Information is displayed, for the user, on display unit 105. The information, for example, is information indicating whether a current operation state is the crime prevention mode or the normal mode.

Stored in packet number storage unit 106 is the packet number that is used in the packet communication with sensor 2. The packet number that is stored in packet number storage unit 106 is managed for every sensor.

Stored in authentication key storage unit 107 is an authentication key that is used for an authentication sequence in which whether or not the other communication party is a legitimate sensor is checked. The authentication key that is stored in authentication key storage unit 107 is managed for every sensor.

Stored in packet encryption key storage unit 108 is a packet encryption key for encrypting a packet at the time of the packet communication. The packet encryption key that is stored in packet encryption key storage unit 108 is managed for every sensor.

Stored in message encryption key storage unit 109 is a message encryption key for encrypting a control message when the control message is exchanged between base unit 1 and the sensor for authentication, packet encryption key generation, and packet number initialization. The message encryption key that is stored in message encryption key storage unit 109 is managed for every sensor.

Power supply unit 110 produces direct current that is necessary for each unit of base unit 1 to operate, from 100 V commercial electric power, and supplies the direct current to each block of base unit 1 (connection to each unit is not illustrated).

Control unit 120 controls operation of the entire base unit 1 in cooperation with each unit described above. Operation of control unit 120 will be described in detail below.

Functional units that are included in base unit 1 are not limited to 100 to 120 that are illustrated in FIG. 2, and may include other functional units. The other functional units may be ones that realize main functions of base unit 1, and may be ones that realize auxiliary functions that assist the main functions.

Configuration of Sensor 2

Figure 3:
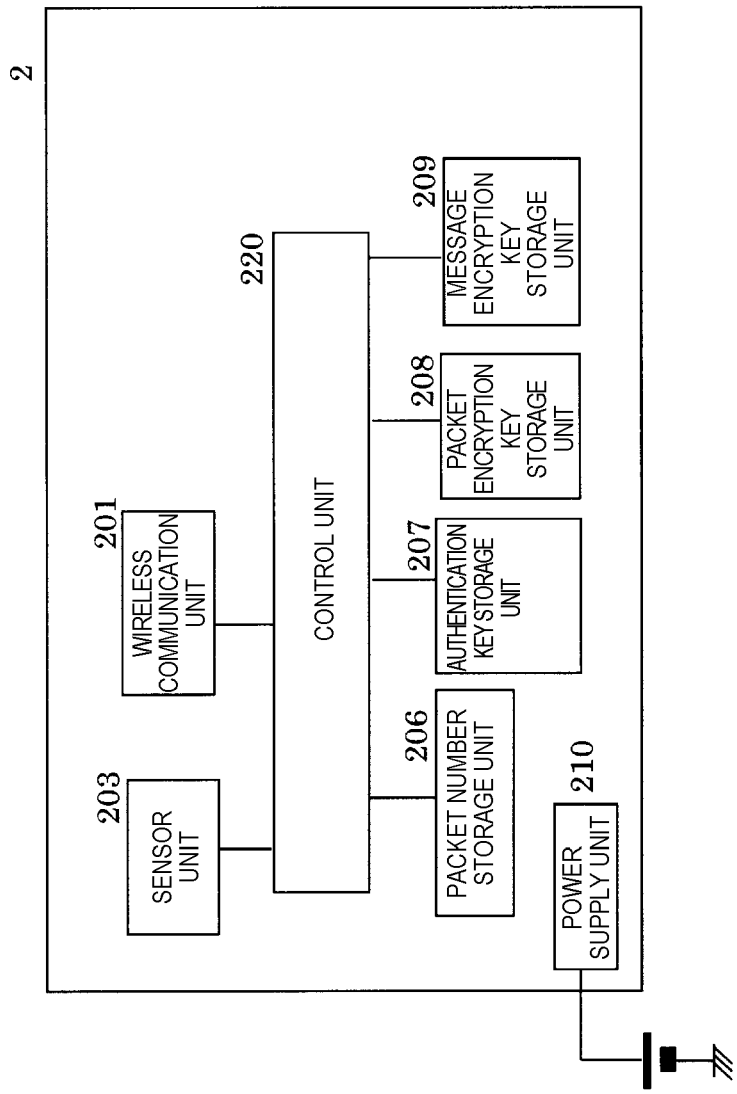
FIG. 3 is a block diagram illustrating one example of a configuration of a sensor according to the first exemplary embodiment of the present invention.

A configuration example of sensor 2 is described. FIG. 3 is a block diagram illustrating a configuration example of sensor 2.

In FIG. 3, sensor 2 has wireless communication unit 201, sensor unit 203, packet number storage unit 206, authentication key storage unit 207, packet encryption key storage unit 208, message encryption key storage unit 209, power supply unit 210, and control unit 220.

Wireless communication unit 201 transmits and receives the control data or the packet for the wireless link establishment or the data telephone call to and from base unit 1 in a predetermined scheme.

Sensor unit 203 detects that the window is opened and notifies control unit 220 that the window is opened.

Stored in packet number storage unit 206 is the packet number that is used for the packet communication with base unit 1.

Stored in authentication key storage unit 207 is the authentication key that is used for the authentication sequence in which whether or not the other communication party is a legitimate sensor is checked.

Stored in packet encryption key storage unit 208 is the packet encryption key for encrypting the packet at the time of the packet communication.

Stored in message encryption key storage unit 209 is the message encryption key for encrypting the control message when the control message is exchanged between sensor 2 and base unit 1 for, the authentication, the packet encryption key generation, and the packet number initialization.

Control unit 220 controls operation of the entire sensor 2 in cooperation with each unit described above. The operation of control unit 220 will be described in detail below.

Functional units that are included in sensor 2 are not limited to 201 to 220 that are illustrated in FIG. 3, and may include other functional units. The other functional units may be ones that realize main functions of sensor 2, and may be ones that realize auxiliary functions that assist the main functions.

Operation of Each of Base Unit 1 and Sensor 2

An operational example of the home automation network system that uses the wireless communication device according to the present invention, which is described above, is described.

Figure 4:
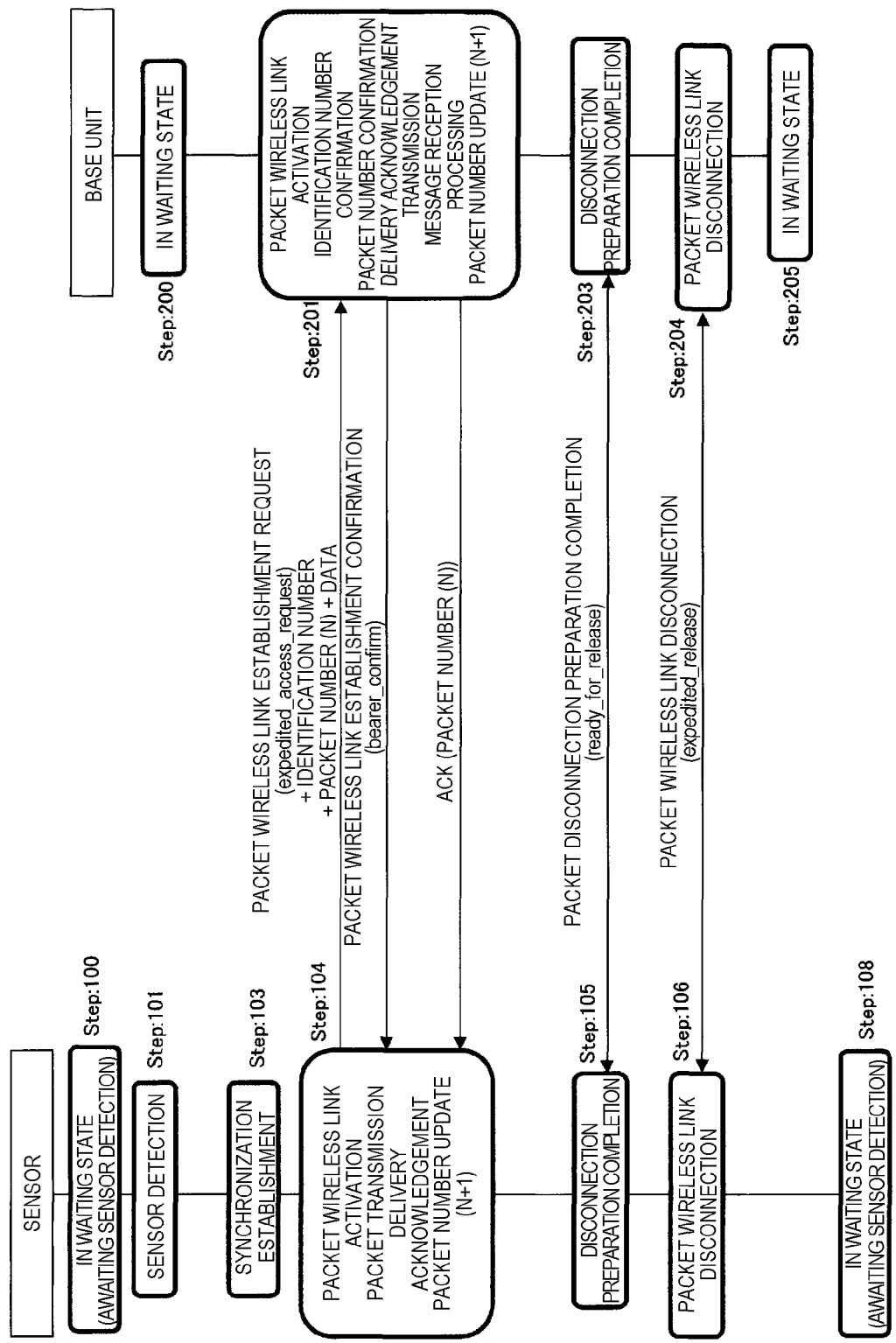
FIG. 4 is a diagram illustrating one example of a signal that is transmitted and received through wireless communication between the base unit and the sensor according to the first exemplary embodiment and of operation of each of the base unit and the sensor.

FIG. 4 is a diagram illustrating one example of a signal that is transmitted and received through wireless communication between base unit 1 and sensor 2 when it is detected that the window is opened, and of operation of each of base unit 1 and sensor 2.

In a waiting state, in sensor 2, sensor unit 203 operates in such a manner as to detect that the window is opened (Step: 100).

On the other hand, in the waiting state, in base unit 1, control unit 120 operates in such a manner that wireless communication unit 100 is controlled to receive a signal from sensor 2 while transmitting a signal (hereinafter referred to as a control signal) for enabling sensor 2 to recognize the base unit and to retain synchronization (Step: 200). Moreover, a frame number that is used when enciphering the control message is also notified with the control signal described above. The frame number is incremented by 1 for every frame, and is transmitted for every frame.

When it is detected in sensor unit 203 in sensor 2 that the window is opened (Step S: 101), control unit 220 establishes synchronization to the base unit, and controls wireless communication unit 201 in such a manner that the wireless communication is activated (Step: 103). For example, in a case where base unit 1 and sensor 2 performs communication through wireless communication in compliance with a DECT scheme, base unit 1 transmits a control signal for enabling a frame and a slot in TDMA to retain synchronization, and by receiving the control signal, sensor 2 establishes the synchronization of the frame and the slot in TDMA to base unit 1 and performs wireless communication in compliance with a TDMA scheme. At this time, base unit 1 transmits the identification number of base unit 1 itself with the control signal, and by receiving a notification, sensor 2 specifies base unit 1 of the home automation network system to which sensor 2 itself belongs and establishes synchronization.

When the synchronization to base unit 1 is completed, control unit 220 of sensor 2 transmits to base unit 1 a packet that results from packetizing data of a message notifying base unit 1 of a packet wireless link establishment request to which the identification number of sensor 2 itself for specifying a sensor of a transmission source is added and that the window is opened, and performs control in such a manner that delivery acknowledgement is performed (Step: 104). At this time, control unit 220 reads the packet number from packet number storage unit 206, reads the packet encryption key from packet encryption key storage unit 208, encrypts the data on the message notifying that the window is opened, using the packet encryption key and the packet number, and transmits to base unit 1 the encrypted data with the packet number being added to the encrypted data. When a delivery acknowledgement (an ACK to which a number corresponding to the transmitted packet number is added) indicating that the packet which is transmitted from base unit 1 is received, control is performed in such a manner that the packet number which is stored in packet number storage unit 206 is updated.

On the other hand, when receiving a packet wireless establishment request from sensor 2, control unit 120 of base unit 1 checks an identification number of sensor 2, which is sent, by comparing the identification number of sensor 2 against an identification number of every sensor that is registered with base unit 1 itself, and determines from which sensor a signal is sent. In a case where the packet wireless establishment request comes from a registered handset, control unit 120 transmits a packet wireless establishment confirmation to sensor 2 and establishes a wireless link for packet communication. Control unit 120 reads a corresponding packet number of the sensor, among the packet numbers that are stored in packet number storage unit 106, compares the packet number that is sent, against the packet number that is read, and determines whether or not the two packet numbers are the same. In a case where the packet number that is sent and the packet number of the sensor, which is stored in the packet number storage unit 106 are the same, control is performed in such a manner that the deliver acknowledgement (ACK) notifying sensor 2 that the packet is received is sent. Among the packet encryption keys that are stored in packet encryption key storage unit 108, the packet encryption key of the corresponding sensor is read, and data in the packet that is received is decoded using the packet number and the packet encryption key. Processing that receives a message that is sent in the packet format, that is, a message notifying that the window is opened, for example, processing that activates the alarm in informing unit 103 or notifies handset 3 and smartphone 5 that the window is opened, is performed, and the packet number corresponding to sensor 2, which is stored in packet number storage unit 106 is updated (Step: 201).

When the transmission and reception of the delivery acknowledgement (ACK) is completed and packet communication interruption preparation is completed, both sensor 2 and base unit 1 send a packet disconnection preparation completion message notifying that the packet communication interruption preparation is completed (Step: 105) (Step: 203).

When packet disconnection preparation completion is received and the other party recognizes that packet communication interruption preparation is completed, sensor 2 and base unit 1 transmit a packet wireless link disconnection message notifying that the packet wireless link is disconnected, and interrupt transmission and reception operations for the packet communication (Step: 106) (Step: 204).

When the transmission and reception operations for the packet communication are interrupted, sensor 2 proceeds to the waiting state in which it is detected that the window is opened (Step: 108). In the same manner, base unit 1 also proceeds to the waiting state in which waits for communication with the sensor (Step: 205).

Step: 100 and Step: 108 in association with sensor 2 illustrate the same state, and Step: 200 and Step: 205 in association with base unit 1 illustrate the same state. Whenever it is detected in sensor unit 203 in sensor 2 that the window is opened, an operation in FIG. 4 is repeated while updating the packet number and base unit 1 is notified that the window is opened.

In a case where base unit 1 and sensor 2 perform the communication through the wireless communication in compliance with the DECT scheme, the packet wireless link establishment request is a message called expedited_access_request that is a message for controlling a MAC layer, a packet wireless link establishment confirmation is a message called bearer_confirm that is the message for controlling the MAC layer, the packet disconnection preparation completion is a message called ready_for_release that is the message for controlling the MAC layer, and the packet wireless link disconnection is a message called expedited_release. Packetization of data is performed in compliance with a FU10a format that is stipulated with a DLC layer, and a message (ACK) for the delivery acknowledgement is established in a FU10d format that is stipulated with the DLC layer.

Next, an example of an operation is described in which, in the home automation network system that uses the wireless communication device according to the present invention, the transmission and the reception during the packet communication between base unit 1 and sensor 2 when it is detected that the window is opened are not correctly performed.

Figure 5:
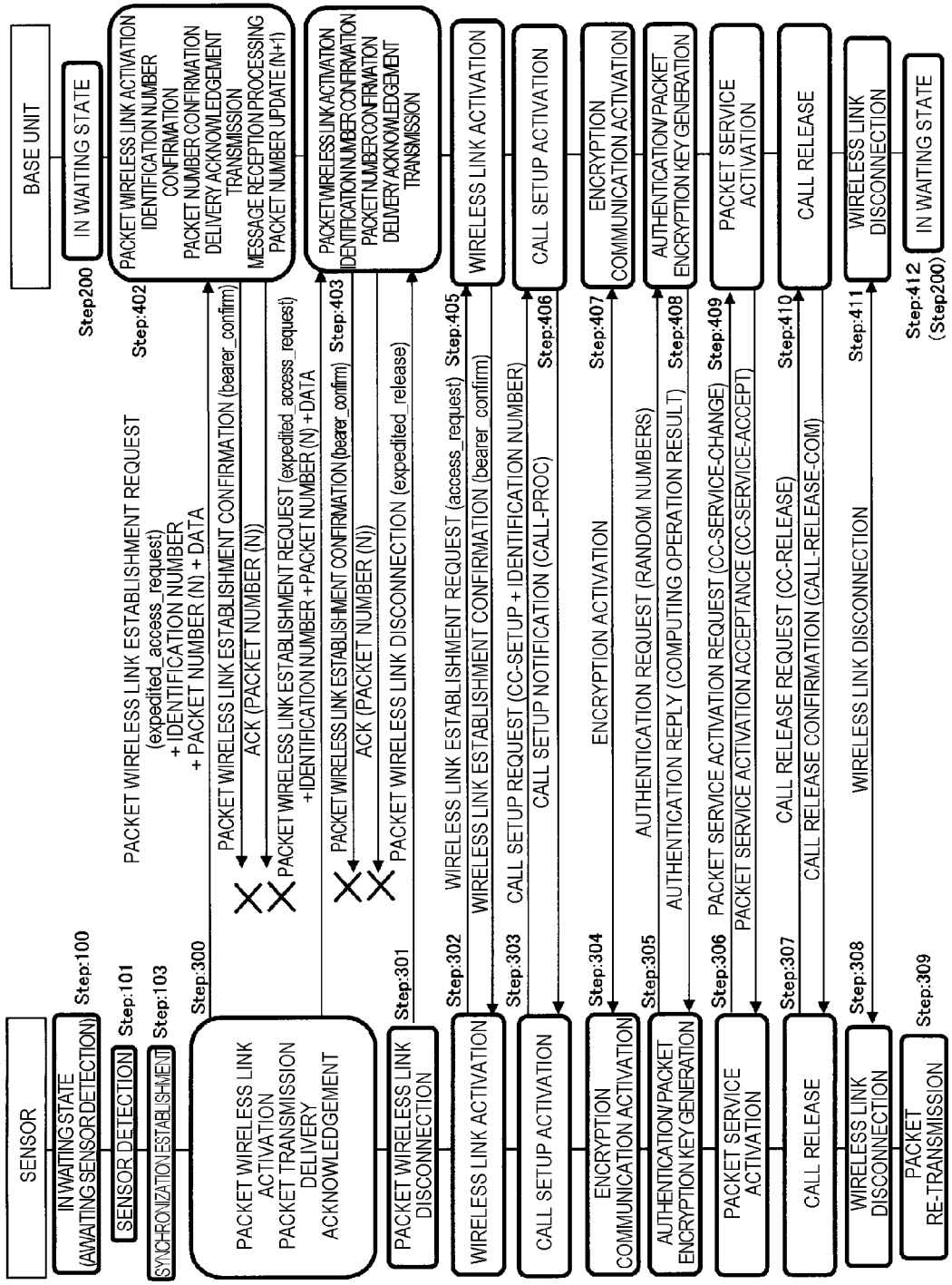
FIG. 5 is a diagram illustrating one example of a signal that is transmitted and received through the wireless communication when a communication failure occurs between the base unit and the sensor according to the first exemplary embodiment and of operation of each of the base unit and the sensor.

FIG. 5 is a diagram illustrating one example of a signal that is transmitted and received through the wireless communication when a communication failure occurs between the base unit and the sensor according to the first exemplary embodiment of the present invention and of operation of each of the base unit and the sensor. FIG. 5 illustrates an example of an operation in a case where the packet wireless establishment confirmation and the delivery acknowledgement (ACK) that are transmitted from base unit 1 cannot be correctly received in sensor 2. In FIG. 5, Step in which the same operation as the operation in FIG. 4 is performed is given the same number, and a description thereof is omitted here.

As described above referring to FIG. 4, in the waiting state, base unit 1 operates in such a manner that the wireless communication unit 100 is controlled to receive a signal from sensor 2, while notifying the frame number and transmitting a control signal that includes the identification number of base unit 1 itself (Step: 200).

On the other hand, as described above referring to FIG. 4, in the waiting state, also in sensor 2, the sensor unit 203 operates in such a manner as to detect that the window is opened (Step: 100). When it is detected that the window is opened (Step: 101), the wireless communication unit 201 is controlled in such a manner that the wireless communication is activated and the synchronization to the base unit is established (Step: 103).

Subsequently, sensor 2 establishes the wireless link for the packet communication, transmits the packet, and starts an operation of receiving the delivery acknowledgement. In a case where operations up to and including a delivery acknowledgement operation cannot be completed within a predetermined period of time, the wireless link for the packet communication is established, the packet is transmitted, and the operation that waits for the deliver acknowledgement is repeated a predetermined number of times (Step: 300). In Step: 300 in FIG. 5, an operational example is illustrated in which the wireless link for the packet communication is established, the packet is transmitted, and the operation that waits for the delivery acknowledgement is performed two times.

On the other hand, when the packet wireless establishment request is received from sensor 2, control unit 120 of base unit 1, as described referring to Step: 201 in FIG. 4, confirms the identification number, transmits the packet wireless establishment confirmation to sensor 2, establishes the wireless link for the packet transmission, confirms the packet number, sends the delivery acknowledgement (ACK), performs message receiving processing that activates the alarm in informing unit 103, notifies handset 3 and smartphone 5 that the window is opened, and the like, and updates the packet number (Step: 402). Moreover, in an operational example in FIG. 5, it is assumed that the packet wireless establishment confirmation and the deliver acknowledgement (ACK) that are transmitted from base unit 1 in Step: 402 cannot be correctly received in sensor 2.

In the case where operations up to and including a delivery acknowledgement operation cannot be completed within a predetermined period of time in Step: 300, sensor 2 establishes the wireless link for the packet communication, transmits the packet, and repeats a predetermined number of times the operation that waits for the deliver acknowledgement, and base unit 1 receives the packet wireless establishment request again (Step: 403). At this time, base unit 1 confirms the identification number, transmits the packet wireless establishment confirmation to sensor 2, establishes the wireless link for the packet communication, confirms the packet number, and, in the case of the number and the packet number that are received last time, performs only delivery acknowledgement transmission. Moreover, in the operational example in FIG. 5, it is assumed that the packet wireless establishment confirmation and the deliver acknowledgement (ACK) that are transmitted from base unit 1 in Step: 403 cannot also be correctly received in sensor 2.

Sensor 2 establishes the wireless link for the packet communication, and transmits the packet, and, in a case where, after the operation of waiting for the deliver acknowledgement is repeated a predetermined number of times, the delivery acknowledgement cannot be received after all, transmits the packet wireless link disconnection notifying that the packet wireless link is disconnected and interrupts the transmission and reception operations for the packet communication (Step: 301).

On the other hand, in Step: 403, when receiving the packet wireless link disconnection without receiving the packet disconnection preparation completion, base unit 1 interrupts the transmission and reception operations for the packet communication.

When the packet communication fails in sensor 2, control unit 220 of sensor 2 controls wireless communication unit 201 in such a manner that the wireless link establishment request is transmitted to base unit 1 (Step: 302). When base unit 1 receives the wireless link establishment request, control unit 120 of base unit 1 controls wireless communication unit 100 in such a manner that the wireless link establishment confirmation is transmitted to the sensor (Step: 405), and a wireless link for performing communication of a call control message between base unit 1 and sensor 2 is activated.

When the wireless link for performing the communication of the call control message is activated, sensor 2 transmits a control message for a call setup request to which the identification number is added (Step: 303). Furthermore, base unit 1 checks the identification number by comparison and determines from which sensor the control message is sent. If the control message is a call setup request from the sensor that is registered, base unit 1 transmits a call setup notification and notifies sensor 2 that a call setup is completed and communication of the call control message is possible (Step: 406).

When the communication of the call control message is possible, a message that activates the encryption communication is exchanged between base unit 1 and sensor 2 (Step: 304) (Step: 407). Thereafter, base unit 1 reads the message encryption key corresponding to sensor 2 from message encryption key storage unit 109, and operates in such a manner that the control message to be transmitted is transmitted being encrypted with the message encryption key and the frame number and the received control message is decoded with the message encryption key and the frame number, and thus processing is performed until the communication of the call control message is disconnected. Thereafter, in the same manner, sensor 2 reads the message encryption key from message encryption key storage unit 209, and operates in such a manner that the control message to be transmitted is transmitted being encrypted with the message encryption key and the frame number and the received control message is decoded with the message encryption key and the frame number, and thus processing is performed until the communication of the call control message is disconnected. In subsequent Steps in FIG. 5, descriptions of operations of encoding and decoding the control message are omitted.

When the activation of the encryption communication is completed, base unit 1 sends an authentication request in order to check whether or not sensor 2 is a legitimate device, and sensor 2 transmits an authentication reply (Step: 305) (Step: 408). At this time, base unit 1 sends random numbers along with an authentication request message, and sensor 2 performs an authentication computing operation that is determined in advance, using the authentication key that is stored in authentication key storage unit 207 and the random numbers that are transmitted from base unit 1, and transmits to base unit 1 a computing operation result of the authentication computing operation along with an authentication replay message. On the other hand, base unit 1 performs the authentication computing operation that is determined in advance, using the authentication key that is stored in authentication key storage unit 107 and the random numbers that are transmitted to sensor 2, and makes comparison between a result of this authentication computing operation and the computing operation result of the authentication computing operation that is sent from the sensor along the authentication reply message. If the two results are the same, base unit 1 determines that the sensor which is engaged in communication is a legitimate sensor. In a process of this authentication, the packet encryption key is re-issued. Sensor 2 performs a packet encryption key generation computing operation that is determined in advance, using the authentication key that is stored in authentication key storage unit 207 and the random numbers that are sent from base unit 1, and stores the obtained result in packet encryption key storage unit 208. Base unit 1 performs the packet encryption key generation computing operation that is determined in advance, using the authentication key that is stored in authentication key storage unit 107 and the random numbers that are transmitted to sensor 2, and stores the obtained result in packet encryption key storage unit 108. Moreover, the authentication key that uses at this point is determined when the base unit and sensor 2 are linked in a pair, and is written to authentication key storage unit 107 and authentication key storage unit 207.

Subsequently, sensor 2 transmits a packet service activation request for activating the packet communication (Step: 306). When receiving the packet service activation request, base unit 1 transmits packet service activation acceptance (Step: 409).

When the packet service activation is completed, control unit 220 of sensor 2 rewrites the packet number that is stored in packet number storage unit 206, as an initial value (for example, 0) that is determined in advance. On the other hand, in the authentication in Step S408, only in a case where it is determined that the sensor which is engaged in communication is a legitimate sensor, control unit 120 of base unit 1 rewrites the number that is stored in packet number storage unit 106, as an initial value (for example, 0) that is determined in advance to be the same as in sensor 2.

When the packet service activation, that is, the initialization of the packet number, is completed, sensor 2 transmits a call release request for releasing a call setup (Step: 307). When receiving the call release request, base unit 1 transmits a call release confirmation (Step: 410).

Then, a wireless link disconnection completion message is transmitted from both sides, and transmission and reception operations for performing the communication of the call control message are interrupted (Step: 308) (Step: 411). Control unit 220 of sensor 2 starts processing that re-transmits a packet notifying that the window is opened (Step: 309). Control unit 120 of base unit 1 proceeds to the waiting state (Step: 412). At this point, operation of base unit 1 in the waiting state is the same as the operation that is described referring to FIG. 4 (Step: 200), and a description thereof is omitted.

In the case where base unit 1 and sensor 2 perform the communication through the wireless communication in compliance with the DECT scheme, the wireless link establishment request is a message called access_request that is the message for controlling the MAC layer, the wireless link establishment request is a message called bearer_confirm that is the message for controlling the MAC layer, the call setup request is a message called CC-SETUP that is a message for controlling a NWK layer, the call setup notification is a message called NWKCC-CALL-PROC that is the message for controlling the NWK layer, the authentication request is a message called AUTHENTICATION_REQUEST that is the message for controlling the NWK layer, the authentication reply is a message called AUTHENTICATION_REPLY that is the message for controlling the NWK layer, the packet service activation request is a message called CC-SERVICE-CHANGE that is the message for controlling the NWK layer, the packet service activation acceptance is a message called CC-SERVICE-ACCEPT that is the message for controlling the NWK layer, the call release request is a message called NWKCC-RELEASE that is the message for controlling the NWK layer, the call release confirmation is a message called CC-RELEASE-COM that is the message for controlling the NWK layer, and the wireless link disconnection is a message called release. An encryption activation message is a message called CIPHER-REQUEST that is the message for controlling the NWK layer, and is a message called start encryption, confirm, or grant that is the message for controlling the MAC layer. In a case where the communication is performed through the wireless communication in compliance with the DECT scheme, a procedure for activation of the DLC layer for transmission and reception of an NWK layer message is needed after establishment of the wireless link, but an example of this is omitted.

Next, an operation example of a case where the packet service activation is completed and then the packet is re-transmitted, that is, an operation of re-transmitting a packet after the operation that is described referring to FIG. 5, in the home automation network system that uses the wireless communication device according to the present invention, which is described above, is described.

Figure 6:
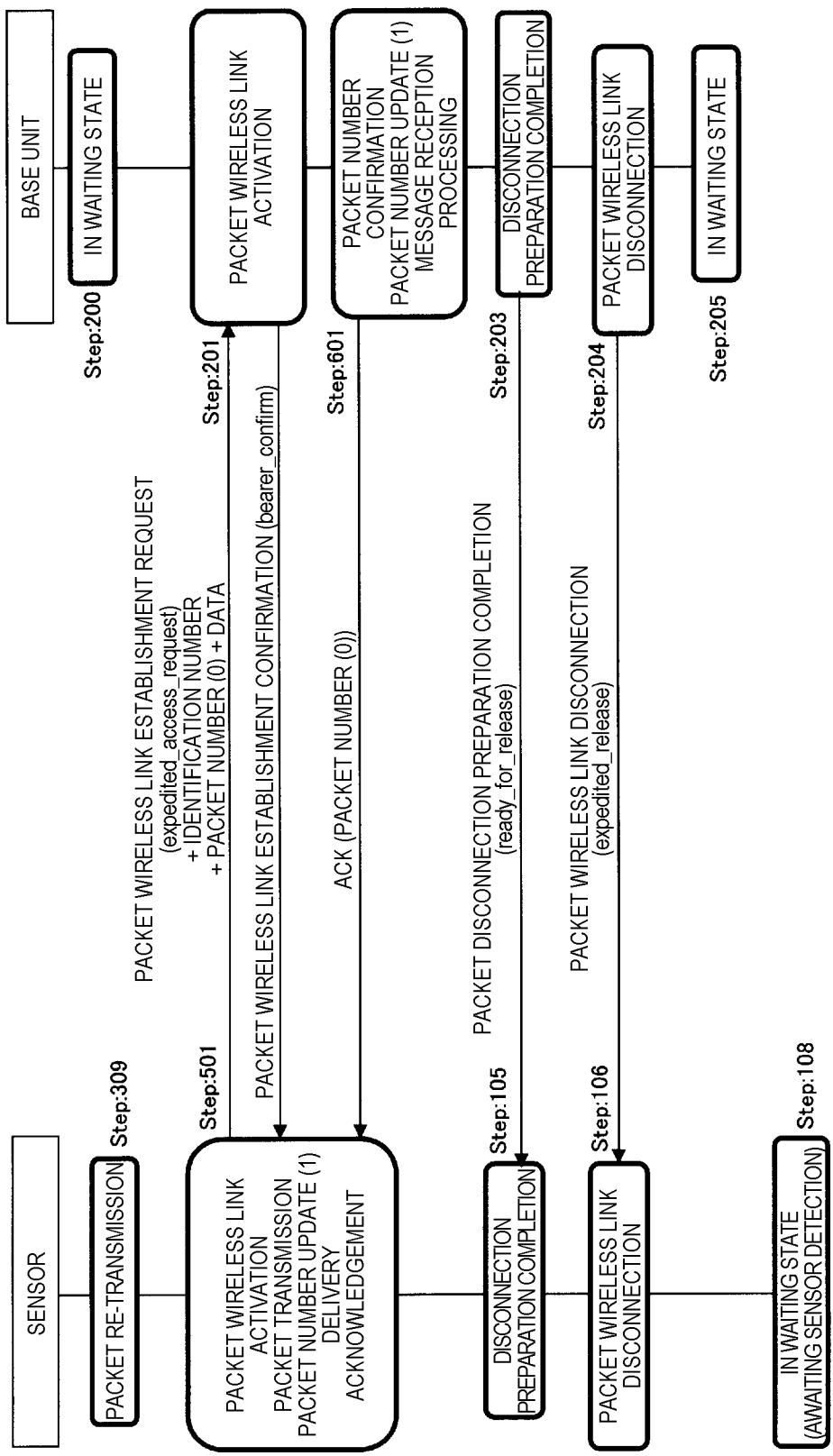
FIG. 6 is a diagram illustrating one example of a signal at the time of packet re-transmission that is transmitted and received through the wireless communication when a communication failure occurs between the base unit and the sensor according to the first exemplary embodiment, and of operation of each of the base unit and the sensor.

FIG. 6 is a diagram illustrating one example of a signal at the time of packet re-transmission that is transmitted and received through the wireless communication after the packet number initialization when the communication failure occurs between base unit 1 and sensor 2, and of operation of each of base unit 1 and sensor 2. In FIG. 6, Step in which the same operation as the operation in FIG. 4 or 5 is performed is given the same number, and a description thereof is omitted here.

After the packet service activation is completed, as described referring to Step: 412 in FIG. 5, base unit 1 waits for a packet from sensor 2 in the waiting state in Step: 200 in FIG. 4. At this time, while transmitting a control signal, control unit 120 of base unit 1 operates in such a manner that wireless communication unit 100 is controlled to receive a signal from sensor 2.

When the synchronization to base unit 1 is completed, control unit 220 of sensor 2 transmits to base unit 1 a packet that results from packetizing data of a message notifying base unit 1 of a packet wireless link establishment request to which the identification number of sensor 2 itself for specifying a sensor of a transmission source is added and that the window is opened, and performs control in such a manner that delivery acknowledgement is performed (Step: 501). At this time, control unit 220 reads the packet number from packet number storage unit 206, reads the packet encryption key from packet encryption key storage unit 208, encrypts the data on the message notifying that the window is opened, using the packet encryption key and the packet number, and transmits the encrypted data with the packet number being added to the encrypted data. When a delivery acknowledgement (an ACK to which a number corresponding to the transmitted packet number is added) indicating that the packet which is transmitted from base unit 1 is received is received, control is performed in such a manner that the packet number which is stored in packet number storage unit 206 is updated. An operation in Step: 501 and the operation in Step: 101 that is described referring to FIG. 4 are different from each other in the packet number that is stored in packet number storage unit 206. In Step: 501, because the first packet transmission after the packet service activation takes place, the packet number that is stored in packet number storage unit 206 is an initial value (for example, 0) that is determined in advance. For example, a value that, after updating, is stored in packet number storage unit 206 is 0 in a case of an initial value, and is 1 in a case where an operation is performed in such a manner that one packet number is updated for every packet. An operation in Step: 501 and the operation in Step: 101 that is described referring to FIG. 4 are different from each other in the packet encryption key that is stored in packet encryption key storage unit 108 and packet encryption key storage unit 208. Because the packet encryption key is changed whenever the packet number is initialized, even in a case where the same message is sent with the same packet number before and after the packet number initialization, the encrypted data in the packet varies each time.

On the other hand, control unit 120 of base unit 1, as described referring to FIG. 4, checks an identification number that is sent, by comparing the identification that is sent against the identification number that is managed by control unit 120 itself, specifies sensor 2, transmits the packet wireless establishment confirmation to sensor 2, and establishes the wireless link for the packet communication (Step: 201).

Control unit 120 reads a corresponding packet number of the sensor, among the packet numbers that are stored in packet number storage unit 106, compares the packet number that is sent, against the packet number that is read, and determines whether or not the two packet numbers are the same. In the case where the packet number that is sent and the packet number of the sensor, which is stored in packet number storage unit 106 are the same, control is performed in such a manner that the processing that receives the message that is sent in the packet format, that is, the message notifying that the window is opened, for example, the processing that activates the alarm in informing unit 103 or notifies handset 3 and smartphone 5 that the window is opened, is performed, that the packet number corresponding to sensor 2, which is stored in packet number storage unit 106 in preparation for the next-time packet reception, is updated, and that the delivery acknowledgement (ACK) notifying sensor 2 that the packet is received is sent (Step: 601). An operation in Step: 601 and the operation in Step: 202 that is described referring to FIG. 4 are different from each other in the packet number that is stored in packet number storage unit 106. In Step: 501, because the first packet reception after the packet service activation takes place, the packet number that is stored in packet number storage unit 106 is an initial value (for example, 0) that is determined in advance. For example, the value that, after update, is stored in packet number storage unit 106 is 0 in a case of an initial value, and is 1 in the case where an operation is performed in such a manner that one packet number is updated for every packet.

When the transmission and reception of the delivery acknowledgement (ACK) are completed and the packet communication interruption preparation is completed, as described above referring to FIG. 4, both sensor 2 and base unit 1 sends the packet disconnection preparation completion message notifying that the packet communication interruption preparation is completed (Step: 105) (Step: 203), transmits the packet wireless link disconnection message notifying that the packet wireless link is disconnected, and interrupts the transmission and receptions operations for the packet communication (Step: 106) (Step: 204).

Sensor 2, as described referring to FIG. 4, proceeds to the waiting state in which it is detected that the window is opened (Step: 108).

In the same manner, when the transmission and reception operations for the packet communication are interrupted, as described above referring to FIG. 4, base unit 1 also proceeds to the waiting state in which base unit 1 waits for communication with the sensor (Step: 205).

The embodiment of the present invention is described above. According to the embodiment described above, an example is described in which, in a case where the communication failure occurs, the packet communication is interrupted, the generation of the packet encryption key and the initialization of the packet number are negotiated, and data of which the delivery acknowledgement is not taken is re-transmitted. However, in the case where the communication failure occurs, the data of which the delivery acknowledgement is not taken may be discarded, the communication with the base unit may be interrupted, processing operations (the generation of the packet encryption key, the initialization of the packet number, and the like) in Step: 302 and later in FIG. 5 may be performed when the sensor becomes responsive anew, and the base unit may be notified an event that occurs anew, in the same manner as in an operation in FIG. 6. In this case, there is a high probability that a factor (for example, communication in a failure source that is a cause of a communication error), which causes the time from when the reception failure occurs to when a new event occur, the packet number is initialized, and the packet communication is performed for the second time to become longer, and which causes the communication failure, will disappear. Furthermore, there is less risk that the recovery processing for removing the failure in the packet communication will be performed repeatedly, and the battery power can be prevented from being consumed more than is necessary.

The embodiment of the present invention is described above. As described above, in the wireless communication device according to the present invention, in a case where the reception error occurs while the packet communication is in progress and the delivery acknowledgement is not correctly performed, because the packet number is initialized and the packet communication is resumed after whether or not the other communication party is a legitimate party is checked, it is possible to decrease the number of times that damage occurs due to the falsification attack that makes an illicit use of a mechanism for the recovery processing.

The wireless communication device according to the present invention changes the packet encryption key when the recovery processing is performed, and therefore encrypted messages, which are transmitted in a case where the same messages are sent with the same packet number before and after the recovery processing, are different from each other. Because of this, it is possible to decrease the number of times that the damage occurs due to the falsification attack.

The wireless communication device according to the present invention encrypts the control message for the recovery processing, using the message encryption key and the frame number, multiple control messages that are encrypted are transmitted and received, and thus the initialization of the frame number or the re-issue of the packet encryption key is performed. Therefore, in order to perform the recovery processing in an illicit manner without knowing the message encryption key, there is a need to perform a round robin attack on all messages, but a round robin pattern is increased according to the number of control messages. Because of this, the level of security against the round robin attack can be raised, and it is possible to decrease the number of times that the damage occurs due to the round robin attack and the falsification attack that make an illicit use of the mechanism for the recovery processing.

The wireless communication device according to the present invention is useful as a wireless communication device for building a home network.

What is claimed is:

1. A wireless communication device that transmits to another communication party a data packet which includes a packet number, the device comprising:
   a first physical storage in which the packet number is stored;
   a second physical storage in which an encryption key is stored;
   a controller that encrypts the data packet which includes the packet number, using the packet number and the encryption key; and
   a wireless communicator that performs transmission and reception of the data packet between the wireless communication device and the other communication party under the control of the controller,
   wherein, when the transmission and reception of the data packet is correctly performed and a delivery acknowledgement is received from the other communication party, the controller updates the packet number stored in the first physical storage,
   wherein, when the transmission and reception of the data packet is not correctly performed, the controller performs authentication between the wireless communication device and the other communication party, rewrites the packet number stored in the first physical storage, as an initial value that is determined in advance, generates a new encryption key, and stores the new encryption key in the second physical storage.

2. The wireless communication device of claim 1, further comprising:
   a third physical storage in which the authentication key is stored,
   wherein the controller performs the authentication using the authentication key.

3. The wireless communication device of claim 2, wherein the controller performs the authentication between the wireless communication device and the other communication party by
   receiving, from the other communication party, an authentication request in order to check whether or not the wireless communication device is a legitimate device, the authentication request including a random number;
   transmitting an authentication reply to the other communication party;
   performing an authentication computing operation, using the authentication key stored in the third physical storage and the random number; and
   transmitting, to the other communication party, a first result of the authentication computing operation along with an authentication reply message,
   wherein the other wireless communication party performs the authentication computing operation, using an authentication key that is stored in the other wireless communication party and the random number, compares a second result of the authentication computing operation by the other wireless communication party and the first result of the authentication computing operation transmitted from the controller of the wireless communication device; and determines that the wireless communication device is a legitimate device, when the first and second results are the same based on the comparison.

4. The wireless communication device of claim 1, wherein
   when the transmission and reception of the data packet is not correctly performed, the controller transmits, to the other communication party, a message for disconnection of a packet wireless link, and stops transmission and reception of the data packet, before the controller performs authentication between the wireless communication device and the other communication party.

5. The wireless communication device of claim 4, wherein
   when the transmission and reception of the data packet is not correctly performed, and after the packet wireless link is disconnected, the controller transmits, to the other communication party, a wireless link establishment request to establish a wireless connection for performing communication of a call control message between the wireless communication device and the other communication party, before the controller performs authentication between the wireless communication device and the other communication party.

6. The wireless communication device of claim 5, wherein
   when the transmission and reception of the data packet is not correctly performed, and after the wireless connection for performing communication of the call control message has been established, the controller transmits, to the other communication party, a message that activates an encryption communication, and
   the controller performs authentication between the wireless communication device and the other communication party, after the encryption communication is activated between the wireless communication device and the other communication party.

7. The wireless communication device of claim 1, further comprising a sensor that detects a predetermined event,
    wherein the wireless communicator is in a waiting state in which the transmission and reception of data packet is not performed until the sensor detects the predetermined event,
    the wireless communicator is activated to start wireless communication with the other communication party, when the sensor detects the predetermined event,
    the wireless communicator returns to the waiting state, when the transmission and reception of the data packet is correctly performed and the packet number is updated, and
    the wireless communicator returns to the waiting state when the transmission and reception of the data packet is not correctly performed and the packet number is rewritten as the initial value.

8. The wireless communication device of claim 1, wherein
    the controller increments the packet number stored in the first physical storage to update the packet number, when the transmission and reception of the data packet is correctly performed and a delivery acknowledgement is received from the other communication party, and
    the controller rewrites the packet number stored in the first physical storage, as zero for the initial value, when the transmission and reception of the data packet is not correctly performed.

9. The wireless communication device of claim 1, wherein
    when the transmission and reception of the data packet is not correctly performed, the controller rewrites the packet number stored in the first physical storage, as the initial value, regardless of whether the packet number stored in the first physical storage is a maximum value.

* * * * *